United States Patent
Blake et al.

(10) Patent No.: US 10,649,684 B2
(45) Date of Patent: May 12, 2020

(54) MEMORY ACCESS MONITORING

(71) Applicant: ARM Limited, Cambridge (GB)

(72) Inventors: Geoffrey Wyman Blake, Austin, TX (US); Pavel Shamis, Austin, TX (US)

(73) Assignee: ARM Limited, Cambridge (GB)

( * ) Notice: Subject to any disclaimer, the term of this patent is extended or adjusted under 35 U.S.C. 154(b) by 44 days.

(21) Appl. No.: 15/460,358

(22) Filed: Mar. 16, 2017

(65) Prior Publication Data

US 2018/0267741 A1  Sep. 20, 2018

(51) Int. Cl.
| G06F 3/06 | (2006.01) |
| G06F 9/54 | (2006.01) |
| G06F 12/0804 | (2016.01) |
| G06F 12/0815 | (2016.01) |
| G06F 13/40 | (2006.01) |
| G06F 13/42 | (2006.01) |

(52) U.S. Cl.
CPC .......... *G06F 3/0653* (2013.01); *G06F 3/0604* (2013.01); *G06F 3/0625* (2013.01); *G06F 3/0673* (2013.01); *G06F 9/542* (2013.01); *G06F 12/0804* (2013.01); *G06F 12/0815* (2013.01); *G06F 13/4068* (2013.01); *G06F 13/42* (2013.01); *G06F 3/067* (2013.01); *G06F 2212/621* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 5,765,195 | A | * | 6/1998 | McDonald | G06F 12/0831 711/141 |
| 7,676,652 | B2 | * | 3/2010 | Francis | G06F 9/30149 712/210 |
| 8,938,587 | B2 | * | 1/2015 | Blaner | G06F 12/082 711/141 |
| 9,361,233 | B2 | * | 6/2016 | Wang | G06F 12/084 |
| 2007/0088916 | A1 | | 4/2007 | Jacobson et al. | |
| 2011/0296421 | A1 | | 12/2011 | Gschwind et al. | |
| 2013/0097385 | A1 | * | 4/2013 | Beckmann | G06F 12/0817 711/128 |
| 2014/0129784 | A1 | | 5/2014 | Chapman et al. | |
| 2014/0250312 | A1 | | 9/2014 | Reinhardt et al. | |
| 2014/0250442 | A1 | | 9/2014 | Reinhardt et al. | |
| 2017/0286301 | A1 | * | 10/2017 | Chang | G06F 12/0831 |

OTHER PUBLICATIONS

International Search Report and Written Opinion of the International Searching Authority dated Mar. 16, 2018 in PCT/GB2018/050198, 13 pages.

* cited by examiner

*Primary Examiner* — Brian R Peugh
(74) *Attorney, Agent, or Firm* — Nixon & Vanderhye P.C.

(57) ABSTRACT

An apparatus has a monitoring data store for storing monitoring data indicating regions of a memory address space to be monitored for changes, which can include at least two non-contiguous regions. Processing circuitry updates the monitoring data in response to an update monitor instruction. Monitoring circuitry monitors accesses to the memory system and provides a notification to the processing circuitry when data associated with one of the monitored regions has changed. This improves performance and energy efficiency by reducing the overhead of polling changes to multiple regions.

22 Claims, 6 Drawing Sheets

MEMORY ACCESS MONITORING

BACKGROUND

Technical Field

The present technique relates to the field of data processing.

Technical Background

A data processing system can have multiple actors which may need to communicate with each other. Each actor can be any independent source of memory accesses (e.g. the multiple actors can include different hardware devices within the system, and/or can include different software processes running on the same hardware device). To communicate between actors, a transmitting actor may write a message to a region of shared memory which can then be read by a recipient actor. Two techniques can be used to allow the recipient to detect the message from the transmitting actor: either the transmitting actor may trigger an interrupt to the recipient actor to flag that a message has been sent, or the recipient actor may continuously poll (read) the relevant memory locations that may change when a message is received, to check whether the data has in fact changed. However, neither of these approaches scales well as the number of message streams increases.

SUMMARY

At least some examples provide an apparatus comprising:
a monitoring data store to store monitoring data indicative of a plurality of regions of a memory address space to be monitored for changes, wherein the monitoring data store is capable of storing monitoring data indicative of at least two non-contiguous regions of the memory address space;
processing circuitry responsive to an update monitor instruction to update the monitoring data stored by the monitoring data store; and
monitoring circuitry to monitor accesses to a memory system and to provide a notification to the processing circuitry in response to detecting that data associated with at least one of said plurality of regions indicated by the monitoring data has changed.

At least some examples provide a method comprising:
in response to an update monitor instruction, updating monitoring data indicative of a plurality of regions of a memory address space to be monitored for changes, the plurality of regions including at least two non-contiguous regions of the memory address space;
monitoring accesses to a memory system; and
providing a notification to the processing circuitry in response to detecting that data associated with at least one of said plurality of regions indicated by the monitoring data has changed.

At least some examples provide a storage medium storing a virtual machine computer program for providing, when executed by a data processing apparatus, an instruction execution environment according to the apparatus described above.

Further aspects, features and advantages of the present technique will be apparent from the following description of examples, which is to be read in conjunction with the accompanying drawings.

DESCRIPTION OF EXAMPLES

There are classes of processing applications that may need to multiplex many communication streams. This is particularly useful for high-performance computing or data centre applications. The communication streams could for example come from a range of sources, including shared memory updates within the machine, remote direct memory access (RDMA) write to buffers, and/or an Ethernet network device updating buffers with new packets received via a network. The number of communication streams can number into the thousands in modern processing environments with all-to-all communication being common. In a traditional system, interrupts or polling of each memory location where new messages could be placed can be used to signal a new message on the stream. However, with the number of streams present in todays systems, interrupts can overload the system as the recipient may receive many separate interrupts from each source of messages. Also, polling is expensive and energy inefficient as it requires repeated reading of each monitored memory location regardless of whether or not those memory locations actually change. The overall time spent polling tends to scale linearly with the number of communication streams to be multiplexed, which causes a performance bottleneck for the recipient.

The present disclosure describes an apparatus having a monitoring data store to store monitoring data which indicates a number of regions of a memory address space to be monitored for changes. The monitoring data store is capable of storing monitoring data which indicates at least two non-contiguous regions of the memory address space. Processing circuitry may execute an update monitor in instruction to update the monitoring data stored by the monitoring data store. Monitoring circuitry monitors accesses to a memory system and provides a notification to the processing circuitry in response to detecting that data associated with at least one of the regions indicated by the monitoring data store has changed.

With this approach, the processing circuitry can register multiple memory regions to the monitoring data store, and the monitoring circuitry can watch for changes to those regions, without requiring the intervention of the processing circuitry. Although it would also be possible to configure the monitoring data store to monitor a contiguous range of addresses, the monitoring data store also has support for defining multiple non-contiguous regions of the address space. Hence, multiple independent communication streams can be monitored for changes by recording the corresponding address locations in the monitoring data store. As the monitoring circuitry monitors memory accesses and provides a notification to the processing circuitry when data in at least one of the monitored regions changes, there is no need for the processing circuitry to repeatedly poll regions whose data does not change, reducing the time spent accessing the monitored regions. Hence, processing performance at the processing circuitry can be improved.

As the processing circuitry does not need to be operational while the monitoring circuitry is monitoring for changes to the monitored regions, the processing circuitry can operate in a power saving state while awaiting the notification, to reduce power consumption. For example, the processing circuitry may support a wait for event instruction which triggers a processing circuitry to enter a power saving state until a certain event occurs. The power saving state may be implemented by reducing a clock frequency or by performing power gating to isolate certain components of the processing circuitry from a power supply, for example. The processing circuitry may exit the power saving state in response to the notification from the monitoring circuitry indicating that a change has been detected for at least one of the monitored regions. Hence, by executing the wait for event instruction after setting up the appropriate monitoring data in the monitoring data store, the processing circuitry can save power and does not need to keep waking up periodically in order to poll the monitored memory regions since the monitoring is performed by the monitoring circuitry instead.

The update monitor instruction executed by the processing circuitry to set the monitoring data in the monitoring data store can take various forms. In one implementation it may be possible for the monitoring data of the monitoring data store to be defined using memory mapped registers so that the update monitor instruction can simply be a conventional store instruction which stores data to the memory addresses which correspond to those memory mapped registers. However, it may be more efficient to provide a dedicated instruction for updating the monitoring data, separate from standard store instructions. For example, a dedicated instruction opcode could be allocated to the update monitor instruction in the instruction set architecture (ISA) supported by the processing circuitry.

In one example the update monitor instruction may identify two or more addresses identifying the regions to be monitored for changes following the update of the monitoring data. For example, the update monitor instruction could specify a base address and a bitmap identifying offsets of the multiple addresses to be monitored relative to the base address. The base address and the bitmap may be encoded as immediate values explicitly identified by the encoding of the update monitoring instruction, or could be accessed from registers specified by the encoding of the update monitor instruction. Hence, multiple non-contiguous regions can be registered in the monitoring data store in response to a single instruction, which can improve performance by reducing the overhead of setting up the monitoring data. The update triggered by the update monitoring instruction could overwrite any data associated with previously monitored address regions, so that the previously monitored address regions are no longer monitored for changes. Alternatively, the update could define new regions to be added to the set of monitored regions, in addition to any previously monitored address regions. Different versions of the update monitoring instruction could be defined in dependence on whether or not the previously monitored regions are to be maintained or cleared.

Alternatively, in other implementations the update monitor instruction could merely identify a single memory address. In this case, multiple update monitor instructions may be executed, each specifying a different address, in order to register each of the multiple non-contiguous addresses in the monitoring data store. Hence, with this approach the instruction is interpreted as defining a new region to be added to the set of regions tracked by the monitoring data. For example, the regions of the address space indicated by the monitoring data could be represented using a filter representation defining a set of addresses to be watched, such as a Bloom filter, each execution of the updates monitor instruction may then add an extra address to the filter.

While some implementations could return an indication of the particular region for which data changed along with the notification sent to the processing circuitry, in many implementations it may be more efficient for the notification to comprise an interrupt or other signal which indicates that an event has occurred without identifying the particular region whose data changed. For example, this may allow the memory change reporting mechanism to be shared with a generic wait for event mechanism which is also used for monitoring other events, unrelated to the monitoring by the monitoring circuitry (e.g. a generic event reporting interrupt may be used). Also, as the processing circuitry may be in a power saving state when the notification is received, the circuitry for responding to the indication of which particular region was accessed may not be operational yet. Therefore, it may be more efficient for the processing circuitry to explicitly request an indication of which of the monitored regions was accessed after receiving the notification that at least one of the regions changed.

Therefore, the processing circuitry may support a report monitoring result instruction which can be executed by the processing circuitry to request that the monitoring circuitry returns an indication of the at least one region for which the data changed. For example, the report monitoring result instruction could trigger the monitoring circuitry to return a bitmap indicating offsets of the addresses of the particular regions that changed (the base address from which the offsets are calculated may be implicit and so may not need to be transmitted by the monitoring circuitry as it may already be known by the process which originally updated the monitoring data to define the monitored regions). Alternatively, the monitoring circuitry could return a single address of a changed region, and multiple report monitoring result instructions may need to be executed to request return of each changed address until there are no more changed regions.

The memory system may access data from memory identified by physical addresses, which are translated from virtual addresses specified by program instructions executed by the processing circuitry. For regular memory accesses, a one-way translation mechanism for translating virtual addresses to physical addresses may be enough. However, the monitoring circuitry may need to report which particular one of the multiple regions being monitored changed, e.g. in response to the report monitoring result instruction. Hence, a reverse translation mechanism may be provided for translating physical addresses back to virtual addresses. The reverse translation mechanism could be provided within the monitoring data store itself (e.g. an indication of both the virtual and physical addresses for the monitoring region could be provided for each monitored region so that when a change is detected to a monitor region based on the physical address then this can be translated to the corresponding virtual address in order to inform the processor of which region change). Alternatively, the reverse translation mechanism could be separate from the monitoring data store (e.g. when the monitoring data store defines a filter representation of the monitored regions, it may not contain an explicit indication of each monitored address, so a separate reverse translation store may contain physical-to-virtual address mappings). Also, a reverse translation mechanism can also be provided in software, with software executing on the processing circuitry translating physical addresses reported by the monitoring circuitry as having been changed into virtual addresses as used by the processing circuitry.

The processing circuitry may also support a clear monitor instruction which triggers the processing circuitry to clear the monitoring data from the monitoring data store so that the previously registered memory locations are no longer monitored for changes by the monitoring circuitry. In some implementations the clear monitor instruction could lead to all the monitoring data being cleared so that none of the previously registered memory locations are monitored for changes anymore. For some implementations of the monitoring data store, it is also possible to provide a version of the clear monitor instruction which may specify at least one specific address of a memory regions for which the monitoring data is to be cleared, so that other regions can still be monitored by the monitoring circuitry after execution of the clear monitor instruction.

The monitoring data in the monitoring data store can also be cleared on occurrence of an exception event. Upon occurrence of exception, such as a context switch, hardware page fault, interrupt etc., the messages to be monitored by the interrupted process executing before the exception occurred are unlikely to be relevant to the subsequent process executing after the exception. To avoid unnecessarily interrupting the subsequent process, the memory monitoring data may be cleared when an exception occurs. On returning from completion of the exception processing, the interrupted process may scan the watched addresses to check for any changes (e.g. by issuing a series of read operations to each of the monitored addresses), before then resetting the monitoring data by executing another update monitor instruction to trigger the monitoring circuitry to resume monitoring again.

In a system having multiple master devices or caches which can access data from a shared memory system, an interconnect may be provided to manage coherency between the masters or caches based on coherency protocol transactions (e.g. snoop transactions) exchanged between the master devices or caches and the interconnect according to a particular coherency protocol. For example in some cases, when shared data is updated by one master device, snoop transactions may be sent to other caches which could hold the corresponding data to trigger an invalidation of the data from those other caches. Such a coherency framework can be reused by the monitoring circuitry for detecting whether data associated with one of the regions indicated by the monitoring data store has changed. Hence, the monitoring circuitry does not need to read the memory locations themselves, but can detect based on the coherency protocol transactions whether data in one of the monitored regions has changed. This could be implemented in different ways. In some cases the monitoring circuitry may be treated as another master device or cache to be snooped on updates to shared data, so that it will receive snoop transactions from the interconnect as part of the coherency scheme to be informed of changes to data elsewhere. Alternatively, the monitoring circuitry could be independent of the master devices and caches for which coherency is maintained, but can intercept the coherency traffic passing between the interconnect and other master devices or caches, and detect based on those coherency protocol transactions when there has been a change to one of the monitored regions.

The size of each region defined by the monitoring data can vary from implementation to implementation. In general, each region corresponds to a certain block of addresses of a given size.

However, the reuse of the coherency framework for monitoring the memory accesses by the monitoring circuitry can be more efficient if the monitoring data defines regions of the same size as the regions corresponding to each coherency protocol transaction. The coherency protocol may operate at the granularity of a predetermined cache line size, so that each coherency protocol transaction specifies an address of a block of data of that predetermined cache line size. Hence, the monitoring data store may also define regions having that predetermined cache line size.

However, the cache line size used by the interconnect and the memory system may not ordinarily be visible to the software executing on the processor. The same code could execute on micro-architectures using a different cache line size. Hence, the apparatus may be provided with a configuration register which specifies a value indicating the predetermined cache line size being used by the interconnect in the coherency protocol. The configuration register can be visible to software executing on the processing circuitry so that the programmer may include an instruction to read the cache line size and then map the addresses to be monitored onto regions of the appropriate cache line size.

The monitoring data store can be implemented in different ways at the microarchitectural level. In one example the monitoring data store may comprise a monitoring data cache which has a number of entries, each entry defining a corresponding region of the address space to be monitored for changes. Each entry can also include other information, such as the reverse address translation mapping from a physical address to a corresponding virtual address discussed above. The monitoring data cache may be included in the coherency scheme managed by the interconnect so that it is treated (for the purposes of snooping) in a similar way to a conventional data cache or instruction cache associated with a given master device. Hence, the interconnect may manage coherency for multiple caches including the monitoring data cache according to a coherency protocol. The monitoring data cache may receive snoop requests when corresponding data in other caches or memory locations changes, and such snoop requests may trigger a change in coherency state at the monitoring data cache which can be detected by the monitoring circuitry and used to trigger the notification to the processing circuitry.

Unlike a conventional data or instruction cache, the monitoring data cache need not actually store the data associated with the corresponding address, as merely storing address tags and coherency state defining data may be enough to allow changes in the data triggered by other devices to be identified.

In systems having multiple master devices each having processing circuitry which may need to set regions of the address space to be monitored for changes, each master device may have a separate monitoring data cache for notifying the processing circuitry of the corresponding master device of changes to the specified address regions.

When the processing circuitry executes the update monitoring instruction, the monitoring data cache may allocate at least one new entry in a shared coherency state of the coherency protocol. The interconnect may operate under the coherency protocol such that when two or more caches hold entries for a given address in the shared coherency state, a write to one of those entries triggers invalidations of corresponding entries in other caches. Hence, the interconnect may trigger a transition of a given entry of the monitoring data cache from the shared coherency state to an invalid coherency state in response to detecting a write to the corresponding region of the address space. The monitoring circuitry may monitor the monitoring data cache for entries which transition from the shared coherency state to the invalid coherency state, and upon detecting a transition to the invalid coherency state the monitoring circuitry may provide the notification to the processing circuitry to signal that one of the monitored regions of the address space has changed.

Unlike a conventional cache, for which the invalidation of an entry of the cache makes the entry available for reallocation to another address, with the monitoring data cache the entry which transitioned from the shared coherency state to the invalid coherency state may be retained in the monitoring data cache. The processing circuitry may expect to receive multiple messages from some communications streams and so once the current message has been read the same location may still need to monitored changes and so it may be preferable to retain the entry in the monitoring data cache. Retaining the entry in the monitoring data cache in the invalid coherency state also enables part of the entry to track the extent to which the change of data at the relevant address has been reported to the processing circuitry. Tracking of the extent to which data changes have been reported to the processing circuitry can help avoid messages being missed by the processing circuitry or messages being reported multiple times.

In one example, an entry of the monitoring data store may be automatically switched from the invalid coherency state to the shared coherency state in response to detecting a read or write access to the corresponding region by the processing circuitry after the processing circuitry has been provided with a region indication identifying the corresponding region as a region for which the change was detected (e.g. the region indication may be the bitmap or other information returned in response to the report monitoring result instruction). Up to the point at which the processing circuitry triggers a read or write access to the changed region of the memory address space, it is not necessary to continue monitoring that region as typically the transmitting actor may have a mechanism for preventing subsequent updates to the memory address representing the message until it has detected that the corresponding region has been read or written by the recipient. However, once the processing circuitry issues a read or write to the corresponding region, it is possible that another message may be sent by the transmitting actor. By switching the corresponding entry of the monitoring data cache from the invalid coherency state to the shared coherency state in response to a read/write to the corresponding region, this automatically rearms the corresponding cache line so that the monitoring circuitry will then continue to monitor that address region for changes and false negatives where a change to a monitored region is missed are avoided.

Note that the access from the processing circuitry which triggers the transition from the invalid coherency state to the shared coherency state can be either a read access or a write access. It may seem counter-intuitive that the processing circuitry may issue a write to the message location without reading the location, as one would expect the processing circuitry to read the received message. However, sometimes the monitored region may not store the actual message or shared data to be sent from the transmitting actor to the receiving actor, but could instead store a lock variable used to control exclusive access to some other shared resource. Hence, on detecting that the transmitting actor has changed the data in the monitored region, this may signal that the transmitting actor has relinquished the lock, allowing the processing circuitry to issue a write access to claim the lock for itself and hence provide access to another shared resource associated with the lock. Hence, the transaction issued by the processing circuitry after receiving the report that a specific address region has changed could be either a read or a write, and both reads and writes can trigger the automatic rearming of the monitoring data cache line to the shared coherency state to recommence monitoring.

As well as indicating information on the coherency state of each entry of the cache according to the relevant coherency protocol, each monitoring data cache entry can also specify reporting state information which indicates the extent to which the change in data associated with a corresponding region has been reported to the processing circuitry. Although in some implementations a single state field could indicate both the coherency state and the reporting state information, it may be simpler to integrate the monitoring data cache with existing coherency protocols if the cache coherency state is indicated by a separate field from the reporting state information, so that the coherency state can be indicated using the same format that is used by other caches of the coherency mechanism.

The reporting state information can indicate whether each entry is in one of the following states:
- an invalid reporting state indicating that the monitoring circuitry is still to detect a change to data associated with the corresponding region;
- a changed state indicating that the monitoring circuitry has detected a change to data associated with the corresponding region, but the processing circuitry is still to be provided with a region indication identifying the corresponding region as a region for which a change was detected; and
- a reported state indicating that the processing circuitry is still to access the corresponding region after being provided with said region indication.

For example each entry could have a two-bit field for indicate one of the three reporting states as the current reporting state for the corresponding entry of the monitoring cache. The fourth encoding of the two-bit field could be invalid or could be reused for other purposes or an additional reporting state.

When a new entry is first allocated to the cache in response to the processing circuitry executing the update monitor instruction, the newly allocated entry may start in the invalid reporting state since no change to data in the corresponding region has yet been reported. When a change to one of the monitored regions is detected by the monitoring circuitry, the corresponding entry of the monitoring data cache may then transition from the invalid reporting state to the changed state (and the coherency state may also transition from shared to invalid at this point).

When the processing circuitry executes the report monitoring result instruction to request the indication of which regions changed, the monitoring circuitry may return to the processing circuitry a region indication corresponding to any region for which the corresponding entry of the monitoring data cache is currently in the changed state, and also triggers a transition of the entries associated with the reported region indications from the changed state to the reported state. Hence, if the processing circuitry then executes another reporting monitoring result instruction, the regions which were already reported in response to a previous execution of the report monitoring result instruction will already be in the reported state and so those regions will not be reported again, as the report monitoring result instruction triggers reporting of those regions whose entries are in the changed state. This provides a mechanism for avoiding the processing circuitry having to process spurious duplicate updates, ensuring that each change to a monitored region is reported once.

When the entry for a given region is in the reported state, this indicates that the processing circuitry has been provided with an indication of the fact that that particular region changed (rather than merely receiving a notification that at least one region changed in general without identifying the particular region). The processing circuitry may then subsequently issue a read or write access to the changed region as discussed above, and at this point the monitoring circuitry may trigger a transition of the corresponding cache entry from the reporting state to the invalid reporting state to indicate that any subsequent changes to the corresponding region in the memory system will need to be reported again to the processing circuitry. As mentioned above, this transition of the reporting state may coincide with the cache coherency state transitioning from invalid to shared, to restart monitoring of changes to the corresponding address.

Implementing the monitoring data store as a monitoring data cache as discussed above can be a relatively efficient way of implementing the monitoring data store, since the monitoring data cache simply appears as another cache to the interconnect and so does not require any changes to an existing interconnect or coherency mechanism, and also the cache can also provide the reverse translation mechanism discussed above, since adding a virtual address tag alongside the physical address tag used for looking up the cache based on snoop addresses can be enough to provide reverse address translation.

A configuration register accessible to the processing circuitry may define the size (number of entries) of the monitoring data cache, so that software can identify how many address regions can be monitored simultaneously. For example the cache can be relatively small and only support a certain number (e.g. 8 or 16) of entries to be monitored at a time, or could be larger depending on the needs of the particular system implementation.

However, there are also other ways in which the monitoring data store can be represented. As mentioned above, rather than providing entries explicitly identifying each address to be monitored, a filter representation could be used where the filter representation can be queried with an address of a region for which data has changed and provide a notification to the processing circuitry when the query detects a match against the filter representation. For example the filter representation may comprise an array of bits, and on updating the monitoring data to add an additional region to be monitored, a selected subset of bits can be set with the bits selected based on one or more hash functions of the address of the additional region. On querying the filter, the address of the region for which data has changed may be hashed in the similar way, and if all the bits corresponding to that address have already been set then a match may be detected. This approach may reduce the amount of storage capacity needed to be stored to define a given number of addresses to be monitored, but may permit some false positive detections when, although the address of the region for which data changed was not actually one of the addresses to be monitored, the hash of the changed address happened to match against a set of bits which had all been set in response to other addresses specified by the processing circuitry. Nevertheless, an occasional false positive detection may be acceptable in order to reduce the storage overhead for the monitoring data.

With the filter approach, there may not be a dedicated entry for each address to be monitored and so tracking of the reporting states of the corresponding region may not be possible. In order to reduce the likelihood that updates to the monitored addresses are missed by the processing circuitry, an address queue may be provided to store an indication of one or more addresses for which the query of the filter detected the match. Hence, when a match of the filter structure is detected, the address of the corresponding data update may be posted to the address queue, from which the processing circuitry when ready may subsequently read the matched addresses from the address queue to identify which regions changed.

The monitoring data store may be located within the interconnect or other part of the memory system, instead of being local to the particular processing circuitry which sets the corresponding monitoring data. For example, the data structure providing the filter representation could be implemented at the point of coherency, for example in parallel with a snoop filter used by the interconnect to track which caches hold data from a particular address. Hence, when a data access to a given address is detected and looked up in the snoop filter, it can also be queried against the filter representation to identify whether it matched any of the regions being monitored. In systems which have multiple master devices each with processing circuitry capable of setting monitoring data to define regions of the address space to be monitored for changes, two or more filter representations may be provided, one per master, with each filter representation storing data indicative of the regions to be monitored as specified by the corresponding master. Hence, the interconnect could query multiple filters and then trigger a notification to the relevant master depending on which of the filters matched against the monitored address.

Figure 1:
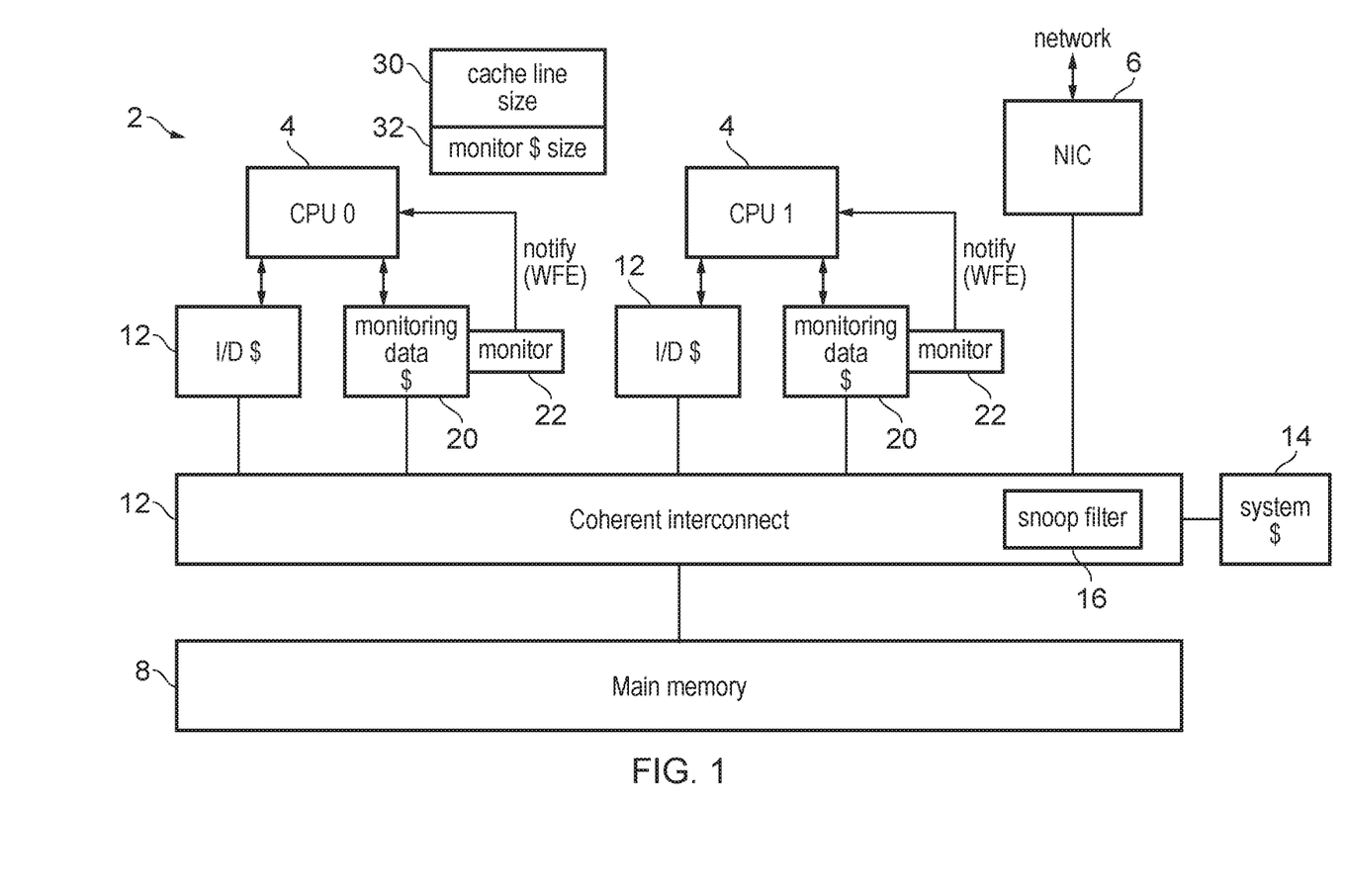
FIG. 1 schematically illustrates an example of an apparatus having a monitoring data store for storing monitoring data indicating at least two non-contiguous regions of a memory address space and monitoring circuitry to monitor accesses to those regions and inform processing circuitry when data in the monitored regions has changed.

FIG. 1 schematically illustrates an example of a data processing system 2 in which the techniques described in this application can be used. The system 2 has a number of master devices 4, 6 which share access to memory 8. In this example the masters include two central processing units (CPUs) 4 and a network interface controller (NIC) 6, but it will be appreciated this is just one example and many other types of master device could be provided, e.g. a graphics processing unit (GPU), display controller, direct memory access (DMA) controller, peripheral input/output (I/O) controller, etc. A coherent interconnect 10 is provided to manage coherency between the respective masters according to a coherency protocol. Examples of suitable coherency protocols can include ARM® AMBA® ACE or ARM® AMBA® CHI provided by ARM® Limited of Cambridge, UK, but it will be appreciated that other coherency protocols can also be used. Some masters, such as the CPUs 4, have one or more caches 12 for caching instructions or data from the memory system. While FIG. 1 illustrates each CPU 4 having a single cache 12 for conciseness, a given master device may have multiple caches, e.g. separate instruction and data caches, or multiple levels of caches (e.g. level 1 and level 2 caches). The apparatus may also include at least one system level cache 14, e.g. coupled to the interconnect 10, which is not assigned to a particular master device but is located closer to the memory system. The system cache 14 can be used for speeding up accesses to the memory system by uncached masters such as a network interface controller 6 which do not have a cache themselves.

The interconnect 10 has a snoop filter 16 which tracks which caches hold data from particular addresses. The snoop filter 16 can be precise, or could use a more approximate representation (e.g. a filter representation) which permits some false positive detections that a given address is cached in a particular cache but does not permit false negatives (cases when data is cached but this is not detected by the filter). On detecting a read or write access from a given master device to a given address, the coherent interconnect 10 looks up the snoop filter 16 for the corresponding address, and identifies which caches may be holding the data, and if necessary transmits snoop requests to the corresponding caches to query the coherency state of the data held by those caches, return corresponding data values, and/or trigger invalidations. The coherency protocol may define what response is to be taken to a particular type of transaction when data is held in a cache in a particular coherency state. For example, when data is cached in a shared state indicating that coherency is to be maintained with corresponding data in other caches, then a write to the shared data by one device may trigger invalidations of the corresponding data in caches elsewhere in system to avoid other master devices accessing potentially out of date information. Hence, the interconnect 10 may exchange various coherency protocol transactions (such as read, write or snoop transactions) with the respective caches or master devices.

A software process running on one of the CPUs 4 may need to multiplex many communication streams received from other actors quickly and efficiently. These communication streams could for example come from other masters 4 which may be updating shared memory, from an external source via the network interface controller 6 or a peripheral I/O device, or from another software process (e.g. another virtual machine) executing on the same master device. To avoid the software process needing to poll a large number of memory locations continuously, each CPU 4 in FIG. 1 is provided with a monitoring data cache 20 for storing monitoring data defining regions of a memory address space to be monitored for changes, and monitoring circuitry 22 to monitor accesses to the memory system. When a change to data in one of the regions in the monitoring data store 20 is detected by the monitoring circuitry 22, the monitoring circuitry 22 sends an interrupt to the corresponding CPU 4 to notify the CPU 4 that one of the monitored addresses has changed. The monitoring data store 20 is capable of storing monitoring data defining a number of non-contiguous addresses, so that multiple cache lines can be monitored for changes in parallel.

At the architectural level, the processor 4 may support a number of instructions in the instruction set architecture which control setting and clearing of the monitoring data in the monitoring data store 20, and reporting of which regions have changed. The instruction decoder of each processor 4 may detect the opcode of instructions fetched for processing, and when one of the memory monitoring instructions discussed below is encountered, controls the processing circuitry 4 to trigger updates of data in the monitoring data cache 20 or requesting of a report of which regions have changed from the monitoring circuitry 20.

Hence, a multi-memory wait instruction is provided to allow the CPU 4 to register memory locations to a CPU-local monitoring store 20, so that a corresponding monitor circuit 22 can then watch for changes to those locations to occur while the CPU can enter a low power mode to wait to be notified of those changes and not miss any changes. This leads to a substantial improvement in the overall polling time as the polling time for monitoring multiple communication streams reduces to the time spent polling for a single communication stream in conventional polling techniques (T_poll=t_single_stream, which is a constant) rather than scaling linearly with the number of communication streams.

The multi-memory wait instruction (update monitor instruction) could be specified in different ways in an architecture. One realization would be a load multi-memory wait (ldmmw) instruction that specifies a base address and a bitmap of sequential address after the base address to watch on:

ldmmw %base, %bitmap where %base specifies a base register storing a base address and %bitmap specifies a register storing a bitmap identifying the offsets of the monitored addresses relative to the base address.

Alternatively, the ldmmw instruction could specify a single address to be monitored for changes (ldmmw %base %offset). In this case, the ldmmw instruction can be called multiple times with different addresses to be watched in a loop. The CPU microarchitecture may then construct a filter representation of the set of addresses to watch for accesses that would change the value of those addresses.

Then using a wait-for-event (wfe) instruction, the processor can be switched to a power saving state, and the processor 4 then waits for the monitor circuitry 22 to signal that a change has been detected. When the monitor circuitry 22 notifies the processor that an event has occurred, a get multi-memory wait result (gmmwr) instruction (report monitoring result instruction) can be executed to trigger the monitoring circuitry 22 to return an indication of which addresses changed. For example gmmwr %dest (where %dest specifies the destination register to which a bitmap of addresses of the changed regions is to be stored). In the background the processor can still collect events on the registered memory locations in between wait-for-event instructions.

Alternatively, if the ldmmw instruction specifies a single address offset, the corresponding gmmwr instruction may return a single address, and when the WFE returns in the normal case, the CPU can then call gmmwr %dest multiple times to collect the addresses that were changed while in WFE. In the case of an exception being taken, the monitor will be cleared for the processor, and on return from the exception, the gmmwr instruction will return an error result, forcing the processor to reset the monitor and scan its set of addresses.

A clear-multi-memory-wait (clear monitor) instruction can also be defined to clear the monitor to stop the processor from watching the addresses and notifying it of changes. Upon an exception (context switch, hard page fault, interrupt etc.), the monitor may be cleared and the WFE may return upon completion of the exception, forcing the processor to scan the watched addresses to check for changes and then reset the monitor by executing another update monitor instruction.

It should be noted that these instructions accept virtual addresses, but they can be processed through a memory management unit (MMU) to be transformed into physical addresses to take part in the microarchitectural implementation.

At the architectural level, the system may have one or more configuration registers 30, 32 which specify parameters used by the code executing on the processor 4 to determine how to set the addresses of the regions to be monitored. For example the configuration registers may include information defining a cache line size 30 which is used by the coherency protocol, defining the granularity at which coherency transactions refer to regions of the address space. Each coherency protocol message may refer to a block of data of a certain cache line size and by making this size visible to the processor 4, the processor 4 can set regions of the corresponding size as the monitored regions in the monitoring data store 20. This makes detection of changes to the monitored regions more efficient as there is a one-to-one mapping between coherency transactions and monitored regions. Also, the configuration registers may include a monitor cache size indication 32 specifying the number of entries of the monitoring data cache 20, so that the software can identify how many different regions of the address space can be monitored concurrently.

As shown in FIG. 1, each master 4 which is capable of setting requests for monitoring of memory locations is provided with its own separate monitoring data cache 20 and monitor circuitry 22. The monitoring data caches 20 are integrated into the coherency scheme managed by the coherent interconnect 10 so that entries in the monitoring data cache 20 are tagged with a coherency state according to the relevant coherency protocol so that they will be snooped in response to changes to the data in the corresponding addresses.

Figure 2:
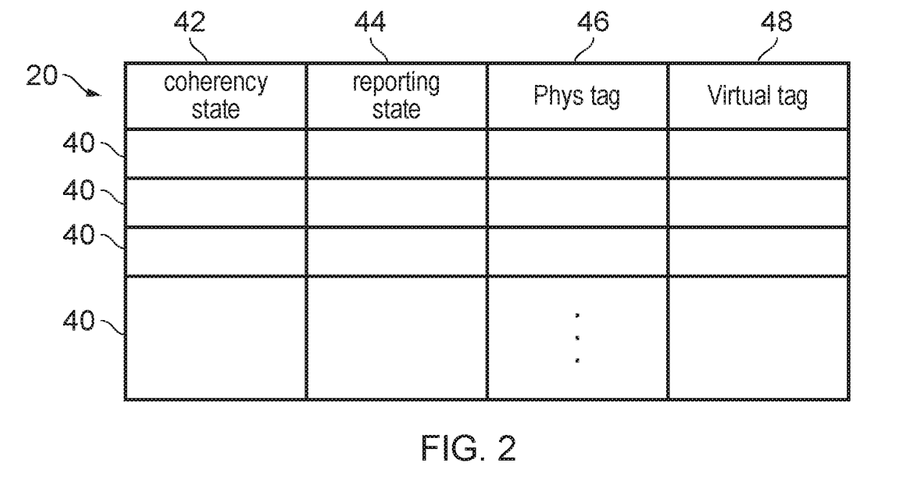
FIG. 2 shows an example of a monitoring data cache.

FIG. 2 shows an example of the monitoring data cache 20, which includes a number of entries 40 each corresponding to one region to be monitored for changes. Each entry 40 includes a number of pieces of information including a coherency state 42 which indicates the state of the corresponding cache line according to the coherency protocol managed by the interconnect 10, a reporting state 44 indicating the extent to which any changes in the data associated with the corresponding region have been reported to the corresponding processing circuitry 4, and physical and virtual tags 46, 48 representing portions of the physical and virtual addresses of the corresponding region to be monitored. By providing both physical and virtual tags 46, 48 in the monitoring data cache 20, the monitoring data cache 20 provides a reverse translation mechanism, since the monitoring cache 40 can be looked up based on a physical address of a coherency protocol and when a match is detected this can be mapped to the corresponding virtual address to be reported to the processor 4. Unlike conventional data or instruction caches, there is no data field for storing the actual data associated with the monitored address, as the state indications and address tags are enough to monitor whether data has changed elsewhere in the memory system.

Figure 3:
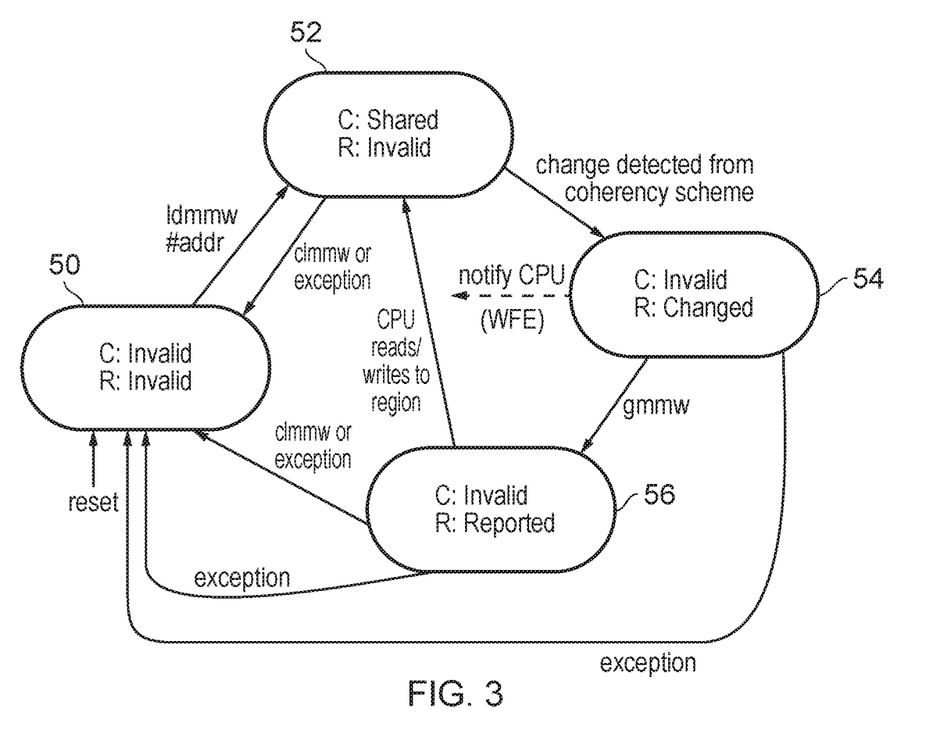
FIG. 3 shows a state diagram indicating coherency state and reporting state transitions for a given entry of the monitoring cache.

FIG. 3 is a state diagram showing how the coherency and reporting states 42, 44 change in response to different events relating to the monitoring of the corresponding address regions. As shown in FIG. 3, the coherency state (C) can be in one of an Invalid coherency state and a Shared coherency state. In the coherency protocol, the Invalid coherency state would indicate that the corresponding cache entry does not contain valid data, while the Shared coherency state would indicate that coherency is to be maintained with corresponding data held in other caches and so a write to shared data elsewhere should trigger an invalidation of the corresponding cache entry. The monitoring scheme reuses these coherency states so that when an entry 40 is in the Invalid coherency state, this indicates that the corresponding address region is not currently being monitored for changes, while the Shared coherency state indicates that the address is being monitored for changes. Note that the coherency protocol may also define additional coherency states other than Invalid or Shared (e.g. Clean or Dirty), but these may not be relevant for monitoring purposes so do not need to be recorded.

The reporting state (R) can be in one of an Invalid state, Changed state or Reported state. Note that the Invalid reporting state is independent of the Invalid coherency state—a cache line can be in Invalid coherency state but in a reporting state other than Invalid, or in the Invalid reporting state but the Shared coherency state. The Invalid reporting state indicates that the address may or may not be monitored but that if monitoring is taking place then a change to the corresponding region has not yet been identified. The Changed state indicates that a change has been detected by the monitoring circuitry 20, but the processor 4 has not requested notification of which region changed. The Reported state indicates that the processor has been informed of which regions changed but has not yet read or written the corresponding memory location.

The state transitions of FIG. 3 are as follows:

On a system reset or other event which leads to initialisation of the system, each entry of the monitoring data cache 20 starts in state 50 where both the coherency state C and reporting state R are Invalid.

In response to execution of the update monitor instruction (ldmmw) specifying one or more addresses to be monitored for changes, one or more entries are allocated to the cache 20 and the newly allocated entries transition to a state 52 in which the coherency state C is Shared and the reporting state R remains Invalid. As the monitoring cache 20 contains shared data, the corresponding address would be marked as held by the monitoring data cache 20 in the snoop filter 16 of the interconnect 10, and so the monitoring data cache 20 would be snooped in response to changes to data in the corresponding address region.

On receipt of an invalidating snoop request specifying one of the monitored addresses from the coherent interconnect 10, a data change in the monitored address region is detected, and the coherency state C of the corresponding entry of the monitoring data cache 20 transitions from Shared to Invalid. Also, the reporting state R transitions from Invalid to Changed. The notification to the CPU (e.g. the interrupt to trigger an exit from the wait for event state) may also be triggered by this transition from state 52 to state 54. Although the coherency state is now Invalid, the entry is retained in the cache to allow tracking of the reporting state, and the entry cannot be reallocated to a different address until it has returned to state 50 (Invalid-Invalid).

Upon execution of the report monitoring result instruction (gmmw) any cache lines, the monitoring circuitry returns an indication of one or more addresses for which the reporting state R of the corresponding cache entry 40 is Changed, and the entry whose address was reported transitions from the Changed reporting state to the Reported reporting state (state 56 of FIG. 3).

When a CPU read or write to a region for which the corresponding monitoring cache entry 40 is in the Reported reporting state 56 is detected, this returns that entry to state 52, i.e. the coherency state C transitions from Invalid to Shared and the reporting state R transitions from Reported to Invalid. Hence, the CPU read or write to the previously reported region automatically rearms the monitoring data store 20 so that the monitoring circuitry 22 will restart monitoring the corresponding region for changes (the Shared data will once more be snooped by the interconnect 20 when data elsewhere is updated). The transition from state 56 to state 52 on a CPU read/write eliminates the possibility of false negative reporting (cases when an update to a monitored region after the processor has read/written the region are missed).

When in either of states 52 and 56, execution of a clear memory monitor instruction (clmmw) or occurrence of an exception causes all cache lines to transition to state 50 (Invalid-Invalid). Alternatively a clear memory monitor instruction could be defined which specifies specific addresses to be cleared of monitoring data and in this case only those particular addresses may have their cache lines transition back to Invalid-Invalid 50. An exception may also cause transitions to Invalid-Invalid from one of states 54, 56, as the loss of the reporting state information in this case may not be a problem as in any case the process that set the monitoring data may scan the monitored addresses for changes on completion of the exception processing and then reset the monitoring data.

In summary, this state control mechanism avoids missing updates but also avoids having to process duplicate updates since the use of the changed and reported states ensures that each changed location will be reported only once by a particular execution of the gmmw instruction.

Figure 4:
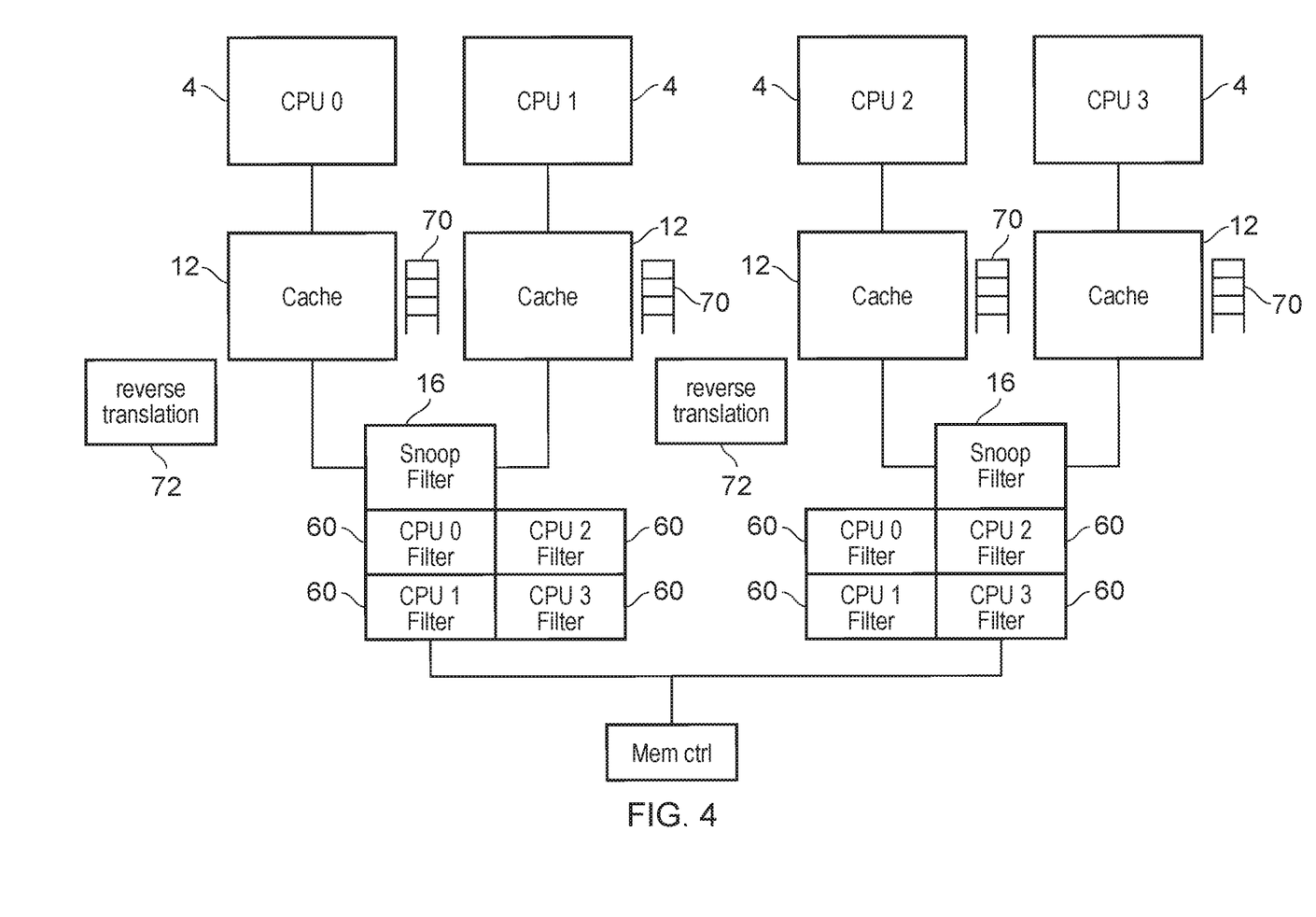
FIG. 4 shows a second example of an apparatus having a monitoring data store, where the monitoring data store is implemented using a filter provided at the point of coherency.

FIG. 4 shows an alternative way of implementing the monitoring data store 20 in hardware. In this case, instead of providing monitoring data caches for each master 4 alongside the existing cache 12, the monitoring store instead comprises a set of filter stores 60 which is provided at the relevant point of coherency. For example, FIG. 4 shows filter stores 60 provides alongside the snoop filter 16 of the interconnect. There may be multiple points of coherency (levels of interconnect) within the system for managing coherency in different subsets of master devices, and so each point of coherency may have a separate set of monitoring data stores 60. In order to track the different sets of monitoring addresses specified by different masters, each point of coherency may have multiple filters, one per master as shown in FIG. 4.

Each monitoring filter 60 may use a filter representation which stores a certain number of filter bits with patterns of bits set depending on hashes of the addresses to be monitored, and queries of the filter representation for an address of data that changed hashing the changed address using corresponding hash functions to those used when setting the filter, and detecting a match if all the bits identified from the hashing of the changed address are already set in the filter. For example a Bloom filter could be used. The filter 60 can keep collecting and posting the notifications even when the processor is not executing a wait for event and in a power saving state to guarantee that no updates are lost. In order to keep collecting events even when the processor is asleep, a hardware message queue (FIFO) 70 may be provided for each processor to continue collecting addresses which can then be read by the processor 4 when next awake.

With this approach, a separate reverse address translation mechanism 72 may be provided for each master in order to perform reverse address translation from physical addresses used by the coherent fabric back to the virtual addresses used by the corresponding processor 4. FIG. 4 for conciseness shows a reverse translation mechanism 72 for two of the CPUs 4 but it will be appreciated that one can be provided for each of the master devices that are capable of setting monitored addresses in the filters 60. Alternatively, instead of providing reverse translation mechanisms in hardware, software executing on the CPUs 4 could translate physical addresses of monitored memory accesses back to virtual addresses used by the CPU 4 to identify the changed memory regions. The size of each filter 60 would need to be sufficiently large to avoid generating too many spurious false positive notifications on non-watched addresses (the smaller the filter, the more likely a pattern of bits corresponding to a given non-watched address happen to all be set due to overlapping with the hashes of the set of watched addresses).

Figure 5:
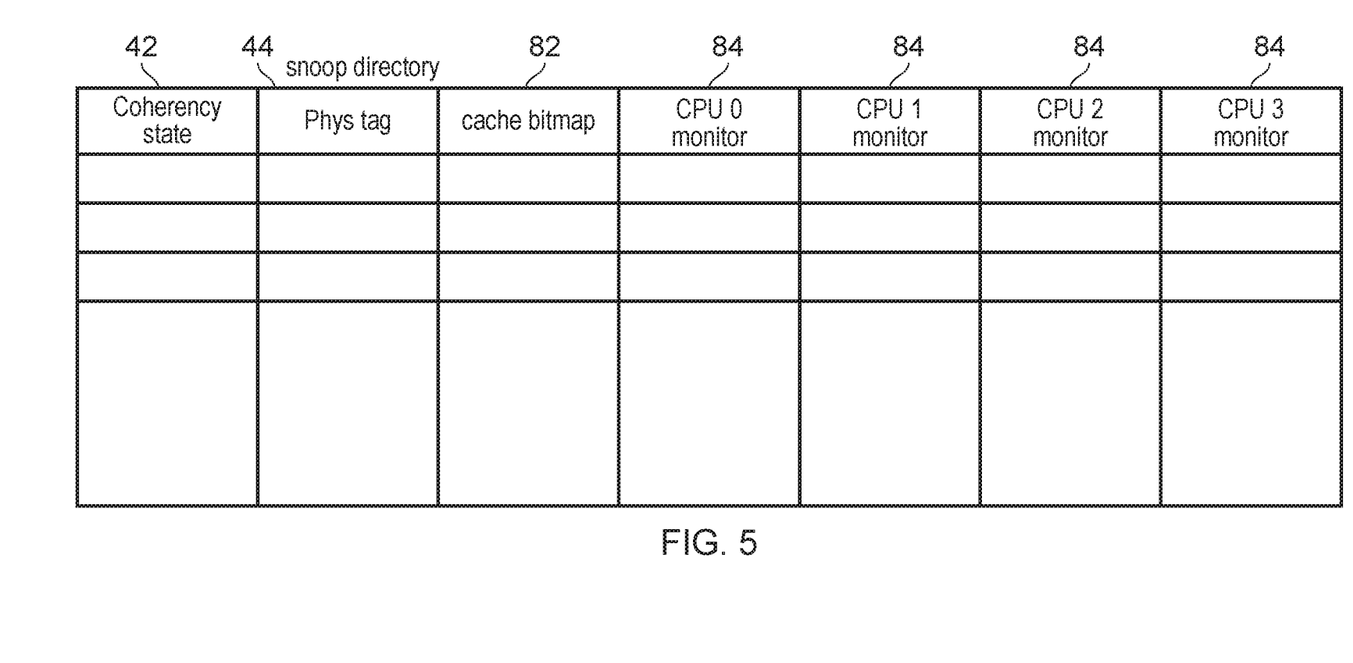
FIG. 5 shows another alternative where the monitoring data store comprises a snoop directory of an interconnect.

For a large system with directory style coherence, another option could be to pass the example bloom filter to each directory node, or to augment each directory node with sticky-bits for the addresses that need to be monitored so they are not discarded when no processor owns that particular line in the caches. For example, as shown in FIG. 5 a snoop directory 80 within the interconnect or other coherency infrastructure could, in addition to coherency state information 42, a physical address tag 44 and a cache bitmap 82 indicating which caches hold valid data for the corresponding address, also hold a set of monitor bits 84 each indicating whether the corresponding address is being monitored by a corresponding processor or other master device. If one or more of the monitor bits 84 is set, the directory entry would be retained even if all the caches invalidate the data, and on detecting a write to the monitored address, the processors flagged as watching that address would be notified. Again, an address queue 70 could be provided per master device for recording the addresses for which changes have been notified. Alternatively, the filter or sticky bits can persist, allowing notifications to continue being generated while the processor is not currently in a wait-for-event so as to not lose events coming in. Alternatively, rather than indicating multiple processors in one directory, each directory could store a filter for each processor, or add more entries to the directory to store sticky bits for cache-lines that may no longer be cached. This could lead to many extra bits being stored in an area and performance sensitive structure. Additionally this implementation would also need a reverse translation mechanism, e.g. another cache that stores physical-to-virtual address mappings, which would look similar to the monitoring cache 20 of FIG. 2.

Figure 6:
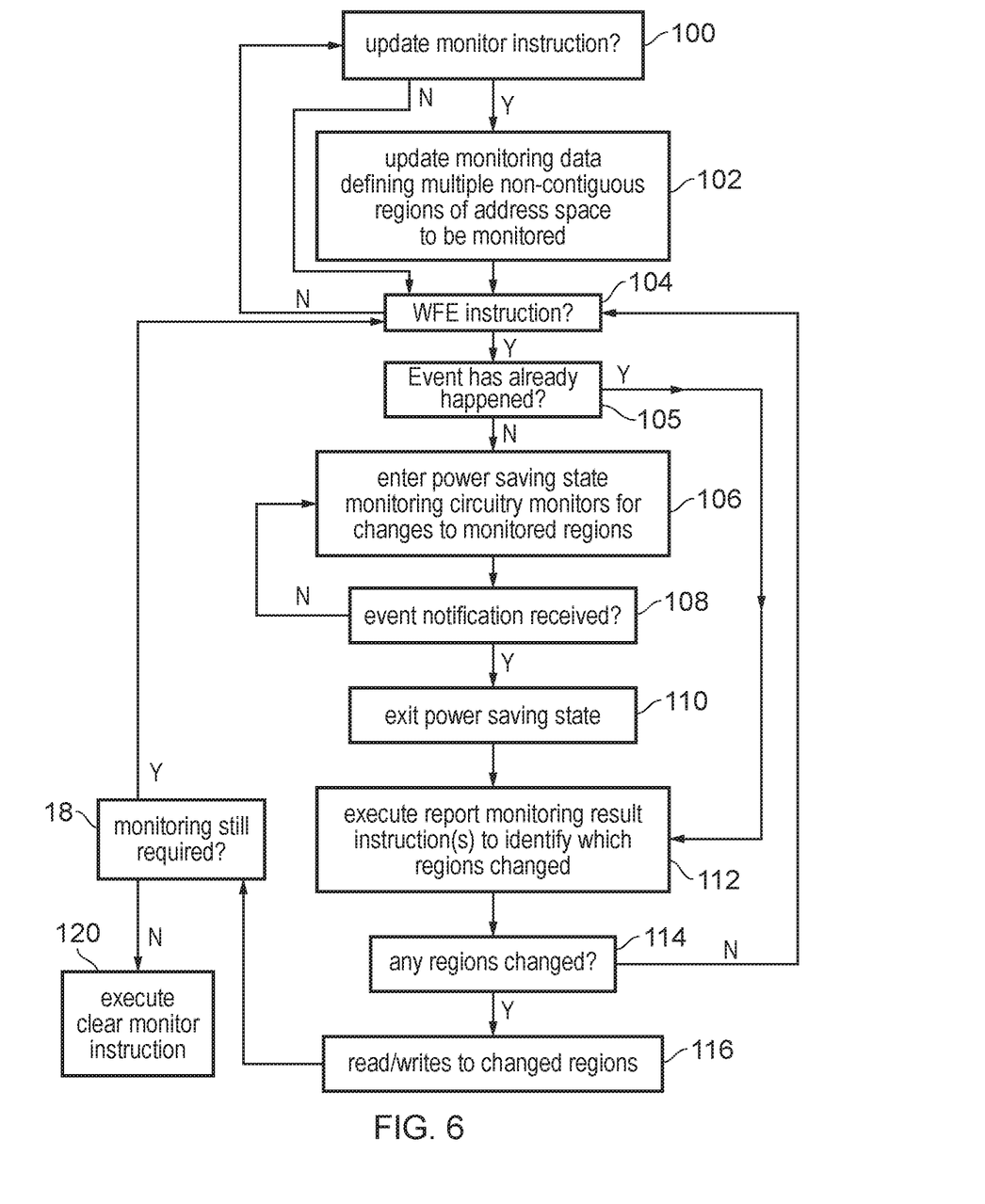
FIG. 6 shows a flow diagram illustrating a method of monitoring accesses to memory.

FIG. 6 shows a method for a given processor 4, in response to instructions specified for a given software processes, to request monitoring of a certain group of address regions and handle notifications of changes to data in those address regions. At step 100 it is determined whether an update monitoring instruction is executed, and if so then at step 102 the monitoring data in the monitoring data store 20, 60 is updated to define multiple (possibly non-contiguous) regions of the address space to be monitored. If no update monitoring instruction is executed then step 102 is skipped. At step 104 it is determined whether the processor has executed a wait for event (WFE) instruction, and if not the processor returns to the step 100 in case the processor 4 is still waiting to define further memory regions to be monitored using subsequent update monitor instructions.

When a wait for event instruction is executed at step 104, then the method proceeds to step 105 where the processing circuitry 4 checks whether an event has already happened. It is possible that the monitoring circuitry 22 may already have received and queued up an event notification before the power saving state has yet been entered in response to the WFE instruction, in which case the queued event may effectively cancel the WFE instruction. If the event has not already happened, the method proceeds to step 106 where the processor enters a power saving state, for example in which certain components of the processor are power gated to reduce power consumption or a clock to some components is gated or reduced in frequency. While in the power saving state the monitoring circuitry 22 monitors for changes to the monitored regions defined in the monitoring data store 20. The monitoring circuitry 22 triggers an event notification (e.g. an interrupt) to the processing circuitry 4 when a change to a monitored region is detected. At step 108, part of the processing circuitry 4 which remains powered on during the power saving state determines whether an event notification has been received, and if not returns to the step 106 to continue to await the event notification. When the event notification is received then the method proceeds to step 110 to exit the power saving state. At step 112 a report monitoring result instruction is executed to identify which regions changed. In response to the report monitoring result instruction the monitored circuitry 22 returns an indication of one or more addresses for which changes were detected. For example the reported addresses can be the addresses for which the corresponding cache entries 40 are in the Changed reporting state in the example of FIGS. 2-3, or addresses stored in the address queue 70 in the example of FIG. 4. If at step 105 the event has already happened, then steps 106-110 are omitted and the method proceeds from step 105 to step 112.

At step 114 the processing circuitry detects whether any regions actually changed. This step may be needed because the wait for event mechanism may be shared with other functions which may trigger event notifications in response to events other than changes to data in a monitoring region, and so it is possible that the event notification may have been received even though no data changed in any of the monitored regions. If no regions have actually changed then the method returns to the step 104 to execute another wait for event instruction and continue to await changes to the monitored regions. If any of the monitored regions did change then at step 116 the processing circuitry 4 triggers read or write transactions to read or write data in the changed regions (e.g. to read the received message or set a lock variable). At step 118 it is determined whether monitoring is still required, and if so then the method returns to step 104 to execute another wait for event instruction to re-enter the power saving state and continue to wait for further updates to the monitoring regions. If monitoring is not required anymore then at step 120 a clear monitor instruction is executed to clear the monitoring data from the monitoring data store and hence stop the monitoring circuitry 22 notifying the processor of any subsequent updates to these regions.

Hence, the software which wishes to receive notification when data changes in any of two or more non-contiguous memory regions can cycle through a loop of instructions including the update monitor instruction, wait-for-event instruction, report monitoring result instruction and memory read/write instructions, before finally executing a clear monitor instruction to stop monitoring. With this approach, there is no need for the processor to continually poll each of the monitored regions, allowing the processor to remain in the power saving state for longer and also reducing memory traffic in the memory system, and hence improving energy efficiency and processing performance.

Figure 7:
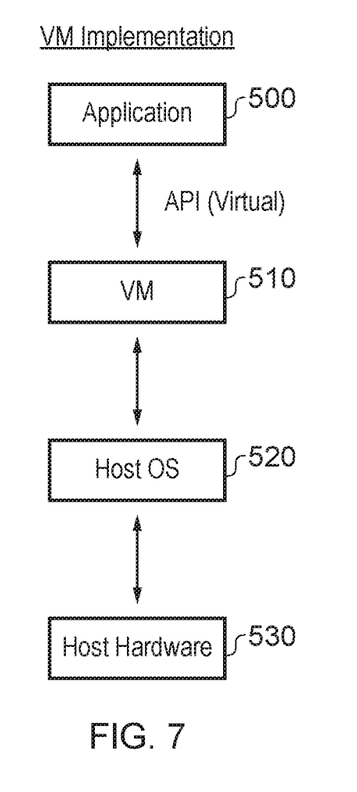
FIG. 7 shows a virtual machine implementation which may be used.

FIG. 7 schematically illustrates a virtual machine embodiment suitable for implementing the techniques described herein in some example embodiments. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, more powerful processors are required to provide virtual machine implementations which execute at a reasonable speed, but such an approach may be justified in certain circumstances, such as when there is a desire to run code native to another processor for compatibility or re-use reasons. The virtual machine program 510 is stored on a storage medium, which may be a non-transitory storage medium. The virtual machine program 510 provides an application program interface to an application program 500 which is the same as the application program interface which would be provided by the real hardware which is the device being modelled by the virtual machine program 510. Thus, in the case of the memory monitoring discussed above, the virtual machine program 510 may define the operations performed in response to an update monitor instruction, report monitoring result instruction or clear monitor instruction of the application program 500 so that the corresponding operations which would be performed in hardware as discussed above are triggered in software by the virtual machine program 510. Similarly, the virtual machine program 510 may include instructions for tracking the state transitions and corresponding changes to the monitor cache as discussed above. In this way, the application-level software 500 executing under the virtual machine does not need to poll multiple memory locations, with the monitoring of memory accesses instead being performed by the virtual machine in response to the memory monitoring configuration instructions of the application program 500.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
processing circuitry to perform data processing, the processing circuitry associated with an instruction decoder to decode instructions;
a monitoring data store to store monitoring data indicative of addresses of a plurality of regions for which an interrupt is to be provided to the processing circuitry when data associated with one of the plurality of regions has changed, wherein the monitoring data store is configured to store said monitoring data indicative of said addresses of said plurality of regions separate from storage of said data associated with said plurality of regions in a cache or memory;
wherein the processing circuitry is responsive to an update monitor instruction decoded by the instruction decoder to update the monitoring data stored by the monitoring data store, wherein the update monitor instruction identifies at least one address identifying at least one new region, for which the interrupt is to be provided to the processing circuitry, to be added to the plurality of regions for which the addresses are indicated by the monitoring data; and in response to the processing circuitry processing one or more update monitor instructions decoded by the instruction decoder specifying addresses of two or more non-contiguous regions of the memory address space, the monitoring data store is configured to store the monitoring data indicating the addresses of said at least two non-contiguous regions of the memory address space simultaneously;

monitoring circuitry to monitor accesses to a memory system and to provide an interrupt to the processing circuitry in response to detecting that data associated with at least one region of said plurality of regions indicated by the monitoring data has changed; and in response to a report monitoring result instruction decoded by the instruction decoder, the processing circuitry is configured to request the monitoring circuitry to return an indication of at least one address of said at least one region for which said data has changed.

2. The apparatus according to claim 1, wherein in response to a wait for event instruction decoded by the instruction decoder, the processing circuitry is configured to enter a power saving state; and the processing circuitry is configured to exit the power saving state in response to the interrupt from the monitoring circuitry.

3. The apparatus according to claim 1, wherein the update monitor instruction identifies a plurality of addresses identifying regions for which the interrupt is to be provided to the processing circuitry following the update of the monitoring data.

4. The apparatus according to claim 3, wherein the update monitor instruction specifies a base address and a bitmap identifying offsets of said plurality of addresses relative to said base address.

5. The apparatus according to claim 1, wherein the processing circuitry is configured to clear the monitoring data in response to one of:

execution of a clear monitor instruction, decoded by the instruction decoder, by the processing circuitry; and
occurrence of an exception event.

6. The apparatus according to claim 1, comprising an interconnect to manage coherency between a plurality of master devices or caches based on coherency protocol transactions exchanged between the master devices or caches and the interconnect;

wherein the monitoring circuitry is configured to detect, based on the coherency protocol transactions, whether data associated with at least one of said plurality of regions indicated by the monitoring data has changed.

7. The apparatus according to claim 6, wherein each coherency protocol transaction specifies an address of a block of data of a predetermined cache line size; and the apparatus comprises a configuration register specifying a value indicative of said predetermined cache line size.

8. The apparatus according to claim 1, wherein at least one of the monitoring data store and the monitoring circuitry comprises a reverse translation mechanism to translate physical addresses specified for the monitored accesses to the memory system into virtual addresses used by the processing circuitry.

9. The apparatus according to claim 1, wherein the monitoring data store comprises a monitoring data cache comprising a plurality of entries, each entry defining a corresponding region for which the interrupt is to be provided to the processing circuitry; and the apparatus comprises an interconnect to manage coherency for a plurality of caches including said monitoring data cache according to a coherency protocol.

10. The apparatus according to claim 9, wherein in response to the processing circuitry executing the update monitor instruction, the monitoring data cache is configured to allocate at least one new entry in a shared coherency state of the coherency protocol;

the interconnect is configured to trigger a transition of a given entry of the monitoring data cache from the shared coherency state to an invalid coherency state in response to detecting a write to the corresponding region; and the monitoring circuitry is configured to provide the interrupt to the processing circuitry in response to detecting the transition of said given entry from the shared coherency state to the invalid coherency state.

11. The apparatus according to claim 10, wherein the monitoring data cache is configured to retain the given entry following the transition from the shared coherency state to the invalid coherency state.

12. The apparatus according to claim 10, wherein the monitoring circuitry is configured to switch an entry from the invalid coherency state to the shared coherency state in response to detecting a read or write access to the corresponding region by the processing circuitry after the processing circuitry has been provided with a region indication identifying the corresponding region as a region for which a change was detected.

13. The apparatus according to claim 9, wherein each entry of the monitoring data cache specifies reporting state information indicating whether that entry is in one of:

an invalid reporting state indicating that the monitoring circuitry is still to detect a change to data associated with the corresponding region;

a changed state indicating that the monitoring circuitry has detected a change to data associated with the corresponding region, but the processing circuitry is still to be provided with a region indication identifying the corresponding region as a region for which a change was detected; and a reported state indicating that the processing circuitry is still to access the corresponding region after being provided with said region indication.

14. The apparatus according to claim 13, wherein in response to execution of the report monitoring result instruction, decoded by the instruction decoder, by the processing circuitry, the monitoring circuitry is configured to return to the processing circuitry at least one region indication corresponding to at least one region for which the corresponding entry of the monitoring data cache is in the changed state, and for each of said at least one region, to trigger a transition of the corresponding entry from the changed state to the reported state.

15. The apparatus according to claim 13, wherein in response to a read or write access by the processing circuitry to a given region for which the corresponding entry of the monitoring data cache is in the reported state, the monitoring circuitry is configured to trigger a transition of the corresponding entry of the monitoring data cache from the reporting state to the invalid reporting state.

16. The apparatus according to claim 1, wherein the monitoring data store is configured to store a data structure providing a filter representation of the addresses of the plurality of regions for which the interrupt is to be provided to the processing circuitry;

wherein the monitoring circuitry is configured to query the filter representation with an address of a region for which data has changed, and to provide the interrupt to the processing circuitry when the query detects a match against the filter representation.

17. The apparatus according to claim 16, comprising an address queue to store an indication of one or more addresses for which the query of the filter detected a match.

18. A storage medium storing a virtual machine computer program for providing, when executed by a data processing apparatus, an instruction execution environment according to the apparatus of claim 1.

19. The apparatus according to claim 1, wherein a type of the interrupt is independent of which of said plurality of regions indicated by the monitoring data is the at least one region for which said data has changed.

20. The apparatus according to claim 1, wherein:

the processing circuitry is directly responsive to the update monitor instruction being decoded by the instruction decoder to update the monitoring data stored by the monitoring data store; and the processing circuitry is directly responsive to the report monitoring result instruction decoded by the instruction decoder to request the monitoring circuitry to return said indication of said at least one address of said at least one region for which said data has changed.

21. The apparatus according to claim 1, wherein said update monitor instruction comprises one of:

an instruction having a dedicated instruction opcode defined in an instruction set architecture supported by the processing circuitry as representing said update monitor instruction, said dedicated instruction opcode indicating that the instruction represents a request to update said monitoring data; and a store instruction specifying at least one address of a memory mapped register corresponding to the monitoring data store, said at least one address of the memory mapped register being different from said at least one address of said at least one new region.

22. A method comprising:

in response to decoding an update monitor instruction by an instruction decoder, updating monitoring data indicative of addresses of a plurality of regions for which an interrupt is to be provided to processing circuitry when data associated with one of the plurality of regions has changed, the monitoring data stored in a monitoring data store separate from storage of said data associated with said plurality of regions in a cache or memory;

wherein the update monitor instruction identifies at least one address identifying at least one new region, for which the interrupt is to be provided to the processing circuitry, to be added to the plurality of regions indicated by the monitoring data;

in response to the processing circuitry processing one or more update monitor instructions decoded by the instruction decoder specifying addresses of two or more non-contiguous regions of the memory address space, the monitoring data store is configured to store the monitoring data indicating the addresses of said at least two non-contiguous regions of the memory address space simultaneously;

monitoring accesses to a memory system; and providing an interrupt to the processing circuitry in response to detecting that data associated with at least one region of said plurality of regions indicated by the monitoring data has changed; and in response to decoding a report monitoring result instruction, requesting monitoring circuitry to return an indication of at least one address of said at least one region for which said data has changed.

* * * * *